(12) United States Patent
Gordon

(10) Patent No.: US 6,533,494 B1
(45) Date of Patent: Mar. 18, 2003

(54) TRANSDUCER MOUNTING DEVICE AND METHOD

(75) Inventor: John Robert Gordon, Houston, TX (US)

(73) Assignee: Bently Nevada, LLC, Minden, NV (US)

(*) Notice: Subject to any disclaimer, the term of this patent is extended or adjusted under 35 U.S.C. 154(b) by 0 days.

(21) Appl. No.: 09/354,632

(22) Filed: Jul. 16, 1999

(51) Int. Cl.[7] .................. B25G 3/34; F16B 25/00
(52) U.S. Cl. .................. 403/306; 403/265; 403/266; 403/300; 403/187; 411/14; 411/386
(58) Field of Search .................. 411/426, 386, 411/14; 403/300, 299, 301, 302, 305, 306, 265, 266, 187, 188, 192

(56) References Cited

U.S. PATENT DOCUMENTS

| | | | |
|---|---|---|---|
| 2,823,574 A | | 2/1958 | Rosan |
| 3,104,335 A | * | 9/1963 | Shoor |
| 4,018,083 A | | 4/1977 | Hoffman |
| 4,041,834 A | * | 8/1977 | Herkes et al. |
| 4,171,173 A | * | 10/1979 | Hymans .......... 403/266 |
| 4,223,585 A | | 9/1980 | Barth et al. |
| 4,447,755 A | * | 5/1984 | Ghiurea |
| 4,502,332 A | | 3/1985 | Sheridan et al. |
| 4,605,292 A | | 8/1986 | McIntosh |
| 4,673,323 A | | 6/1987 | Russo |
| 4,752,151 A | * | 6/1988 | Ashida et al. .......... 403/266 |
| 4,771,637 A | | 9/1988 | Kubler |
| 4,788,871 A | | 12/1988 | Nelson et al. |
| 4,822,224 A | | 4/1989 | Carl et al. |
| 4,822,656 A | | 4/1989 | Hutter, III |
| 4,823,602 A | * | 4/1989 | Christensen, Jr. |
| 4,900,207 A | | 2/1990 | McGovern |
| 4,928,531 A | * | 5/1990 | Shult et al. |
| 5,415,026 A | | 5/1995 | Ford |
| 5,518,351 A | * | 5/1996 | Peil |
| 5,527,111 A | | 6/1996 | Lysen et al. |
| 5,644,093 A | | 7/1997 | Wright et al. |
| 5,650,720 A | | 7/1997 | Brockmüller et al. |
| 5,691,904 A | | 11/1997 | Lysen |
| 5,755,542 A | | 5/1998 | Janusz et al. |

FOREIGN PATENT DOCUMENTS

| | | |
|---|---|---|
| GB | 2280064 A | 11/1996 |
| WO | 96/36855 | 1/1995 |
| WO | WO-96/36855 | * 11/1996 |

* cited by examiner

Primary Examiner—Lynne H. Browne
Assistant Examiner—Ernesto Garcia
(74) Attorney, Agent, or Firm—Dennis DeBoo

(57) ABSTRACT

A transducer mounting device comprised of a monolith of moldable material overlying and supporting a self-tapping screw at one end for coupling to a target such as a machine casing or bearing housing and a fabricated insert at an opposite end for mating with a monitoring transducer. In a further preferred form a transducer mounting device is comprised of a preform including an internal cavity overlying a magnetic component, an adhesive interposed between the magnetic component and a target such as a machine casing or bearing housing at one end for magnetically and adhesively bonding said preform to the target and a threaded member disposed at an opposite end of the preform for mating with a monitoring transducer.

13 Claims, 3 Drawing Sheets

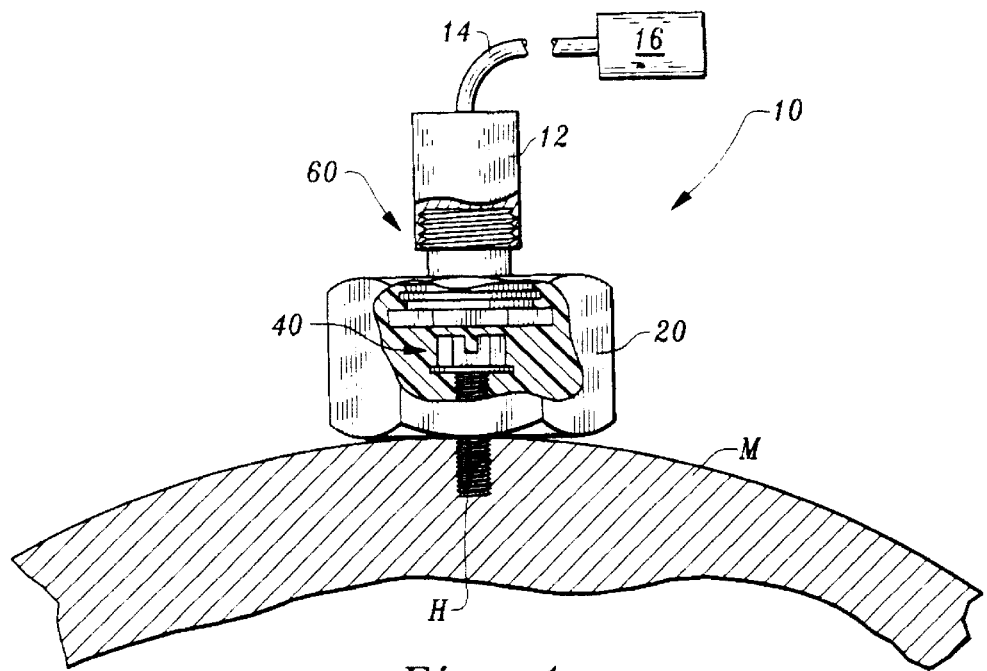
Fig. 1
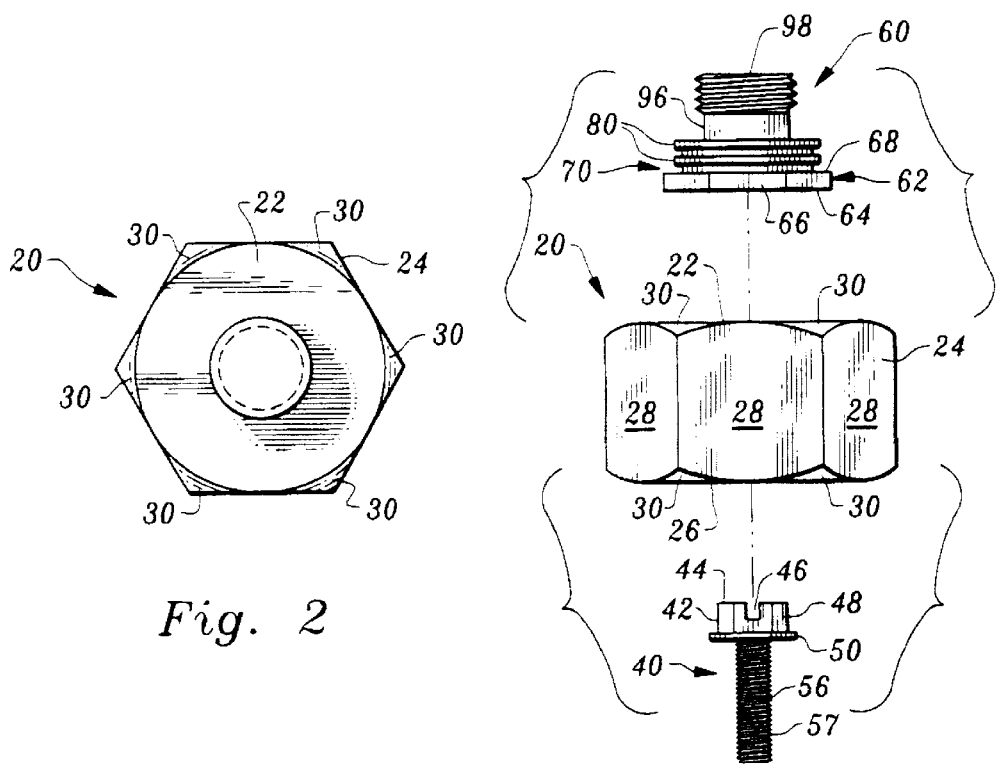
Fig. 2
Fig. 3

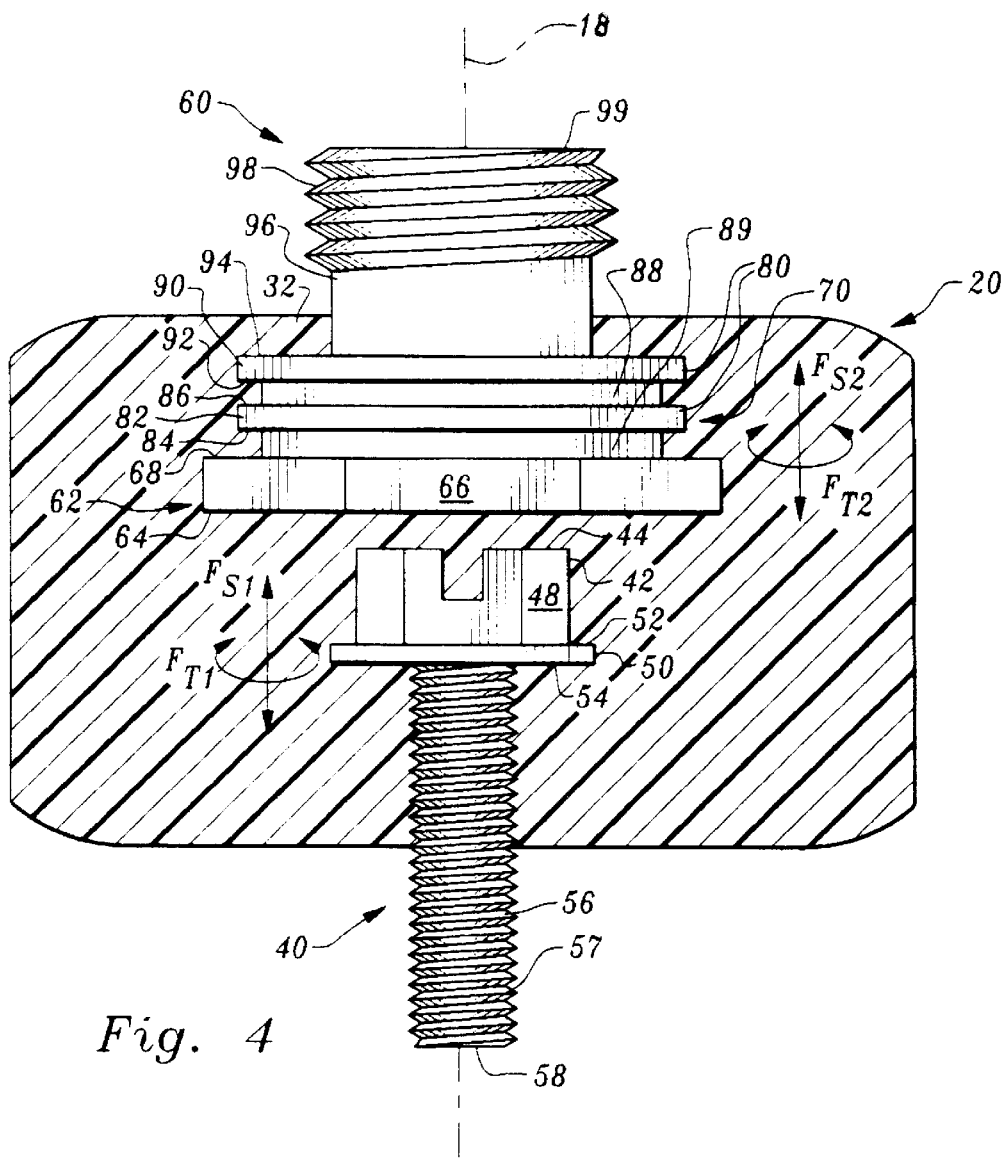
Fig. 4
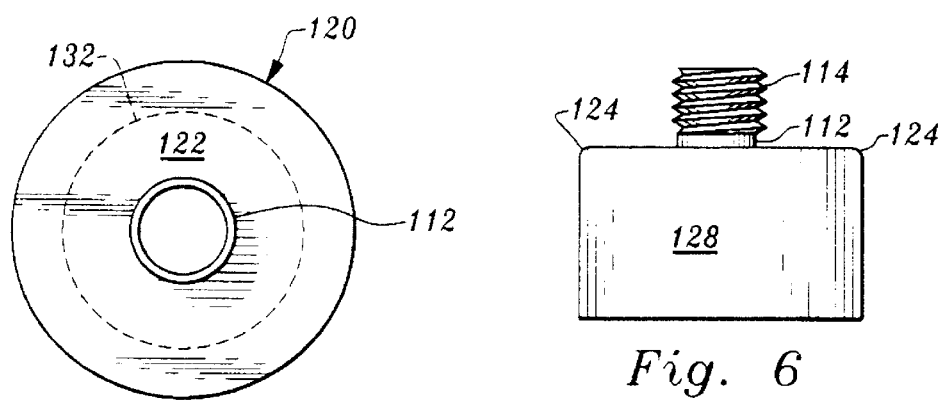
Fig. 5
Fig. 6

TRANSDUCER MOUNTING DEVICE AND METHOD

FIELD OF THE INVENTION

The instant invention relates generally to transducer mounting instrumentalities and, in particular, to a seismic transducer mounting device and method.

BACKGROUND OF THE INVENTION

Traditionally, seismic transducers are mounted by installing a single piece machined metal stud to a general purpose machine and attaching the transducer to the stud. The two most accepted stud installation schemes include a drill and tap mounting scheme and an adhesive mounting scheme.

The drill and tap mounting scheme for mounting a seismic transducer includes the step of milling a spot face (a flat spot) onto a target, for example, an area on a machine casing or a bearing housing. Then, a hole is drilled into the milled area of the target to a predetermined depth. This typically requires tethering a drill motor into place via, for example, using a chain strap in order to ensure that the drill has perpendicularity to the target while providing support for drilling a substantially large hole. Threads are then formed within the hole by taping the hole while making sure perpendicularity to the target is maintained. Then, a single piece machined metal stud having two threaded ends is provided wherein one of the threaded ends is threaded into the drilled and tapped hole and the other treaded end is mated with the seismic transducer thereby completing the drill and tap mounting scheme.

The drill and tap mounting scheme is dependable, but requires a great deal of documentation and machining time. The documentation can take up to approximately six hours per transducer point, while machining time per point can take approximately two and one half hours. Thus, the drill and tap mounting scheme is, inter alia, a laborious and costly method for installing seismic transducers.

The adhesive mounting scheme for mounting a seismic transducer includes the step of removing all dirt, oil, and paint from a target, for example, an area on a machine casing or a bearing housing by cleaning and grinding the area. Next, a single piece machined metal stud is provided which includes a threaded top end integrally formed with an outwardly projecting planar bottom end that includes a flat bottom surface. A two-part adhesive is then mixed and applied to the bottom surface of the planar bottom end. The stud is then placed onto the machine at the target area and the adhesive is allowed to cure under partial pressure supplied by a removable clamping mechanism. Once the adhesive is dried, the clamping mechanism can be removed.

Thus, in comparison, the adhesive mounting scheme can reduce the documentation and installation time by as much as 75%. However, adhesive attachments have been found to have short term failure rates as high as 25%. These adhesive failures are caused by the typical industrial environment and by the substrates (materials) being bonded. For example, an environment of high heat and humidity can reduce the strength of an adhesive by 75% over a six-month time span. Furthermore, the casted metals that typical machine casings are made from offer poor bonding capabilities for all types of adhesives. It has been found that when these adhesive failures occur the adhesive always comes off still attached to the stud and the casted machine surface is substantially void of any adhesive remnants. This indicates that the bond failed at the casted machine's surface, otherwise the adhesive would stay completely attached to the machine if failure occurred at the stud, or the adhesive would be split between the two substrates indicating adhesive failure in shear.

For the foregoing reasons, there is a need for a device and method which provides a durable transducer mounting scheme which reduces the labor intensive task, the associated high cost and the failure rate of attaching seismic transducers to general purpose machinery.

In particular, industrial plantwide networked asset systems are available and desirable to monitor assets, including general purpose machinery, throughout a plant or facility. However, a problem exists in that these systems are very expensive to install using the traditional mounting schemes for mounting a multiplicity of seismic transducers throughout the plant or facility. Therefore, there is a need for providing a durable and inexpensive transducer mounting device and method for eliminating the high installation expenses and failure rates associated with traditional transducer mounting schemes.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| PATENT NO. | ISSUE DATE | INVENTOR |
| --- | --- | --- |
| 2,823,574 | Feb. 18, 1958 | Rosan |
| 4,041,834 | Aug. 16, 1977 | Herkes, et al. |
| 4,018,083 | April 19, 1977 | Hoffman |
| 4,223,585 | Sept. 23, 1980 | Barth, et al. |
| 4,447,755 | May 8, 1984 | Ghiurea |
| 4,502,332 | March 5, 1985 | Sheridan, et al. |
| 4,605,292 | Aug. 12, 1986 | McIntosh |
| 4,673,323 | June 16, 1987 | Russo |
| 4,771,637 | Sept. 20, 1988 | Kubler |
| 4,788,871 | Dec. 6, 1988 | Nelson, et al. |
| 4,822,224 | April 18, 1989 | Carl, et al. |
| 4,822,656 | April 18, 1989 | Hutter, III |
| 4,823,602 | April 25, 1989 | Christensen, Jr. |
| 4,900,207 | Feb. 13, 1990 | McGovern |
| 4,928,531 | May 29, 1990 | Schult, et al. |
| GB 2280064A | Jan. 18, 1995 | Prüftechnik |
| 5,415,026 | May 16, 1995 | Ford |
| 5,518,351 | May 21, 1996 | Peil |
| 5,527,111 | June 18, 1996 | Lysen, et al. |
| WO 96/36855 | Nov. 21, 1996 | Prüftechnik |
| 5,644,093 | July 1, 1997 | Wright, et al. |
| 5,650,720 | July 22, 1997 | Brockmüller, et al. |
| 5,691,904 | Nov. 25, 1997 | Lysen |
| 5,755,542 | May 26, 1998 | Janusz, et al. |

SUMMARY OF THE INVENTION

The instant invention is distinguished over the known prior art in a multiplicity of ways. One of the starkest differentiations that the instant invention enjoys over the known prior art involves the fact that the instant invention is a transducer mounting device which is a composite of a faceted monolith of moldable material overlying and supporting a self-tapping stud at one end and a fabricated insert at an opposite end. Additionally, the instant invention provides a transducer mounting device and method that is durable in construction while being inexpensive to manufacture. Furthermore, the instant invention provides a transducer mounting device and method which solves the labor intensive and time consuming task inherent in the existing drill and tap mounting schemes for mounting transducers. Moreover, the instant invention provides a further transducer mounting device and method that solves, inter alia, the short-term failure rates inherent in the existing adhesive mounting schemes for mounting transducers.

In one preferred form, the transducer mounting device or composite stud of the instant invention includes a faceted monolith of moldable material or plastic body overlying and supporting two substantially axially aligned threaded metal components.

The first metal component is comprised of a self-tapping screw which attaches to a target and includes a multi-faceted head, an annular shoulder preferably integrally formed with the head and a shaft below the shoulder. The shaft includes exterior threads which preferably extend from below the shoulder to a distal tapered pilot point which precludes the necessity for tapping a hole in the target, for example, an area on a machine casing or bearing housing which is to receive the self-tapping screw of the device.

The second metal component is comprised of a fabricated insert that interfaces with a transducer. The fabricated insert includes a faceted extremity transitioning into an annular shaped neck. The neck includes a plurality of collocated ribs in the form of a plurality of axially spaced radially protruding orbicularly shaped structures. The ribs transition into an elongated shank member which includes threads circumscribing the shank at an extremity distal from the collocated ribs. These threads mate with, for example, a seismic transducer used for monitoring the status of machinery.

The monolith of moldable material or plastic body includes an uppermost surface, a side portion and a lowermost surface. The uppermost surface is substantially planar in shape and transitions substantially perpendicularly into the side portion. The side portion preferably includes multiple facets arranged to allow a torque applying device to effectively engage the body. Preferably, the facets are arranged in a hexagonal pattern to be engaged by a variety of commonly available tools for inserting the device into the hole.

The self-tapping screw and the fabricated insert are disposed asunder along a central long axis of the transducer mounting device and are each partially enclaved within the monolith of moldable material or plastic body. The multi-faceted head of the self-tapping screw precludes torsional shear within and from the monolith of moldable material while the annular shoulder integrally formed therewith provides a flat bearing surface which precludes axial shear within and from the monolith of moldable material. Likewise, the faceted extremity of the fabricated insert precludes torsional shear within and from the monolith of moldable material while the collocated ribs provide bearing surfaces which precludes axial shear within and from the monolith of moldable material. Additionally, a first interlocking means for interlocking the monolith of moldable material into the fabricated insert is integrally formed with the monolith of moldable material and includes a first extension extending into at least one annular recess disposed between the collocated ribs for mechanically interlocking the monolith of moldable material into the fabricated insert. Furthermore, a second interlocking means for interlocking the monolith of moldable material into the fabricated insert is integrally formed with the monolith of moldable material and includes a second extension extending into an annular recess disposed between the collocated ribs and the faceted extremity of the insert for mechanically interlocking the monolith of moldable material into the fabricated insert.

In a further preferred form, the transducer mounting device of the instant invention includes a composite device formed from a cylindrical preform overlying and supporting a magnetic component adhesively coupled at one end to a target, for example, an area of a machine casing or a bearing housing being monitored. The preform includes an integrally formed threaded member at an end opposite the magnetic/adhesive coupling which interfaces with a seismic transducer for monitoring the status of machinery.

OBJECTS OF THE INVENTION

Accordingly, a primary object of the instant invention is to provide a new, novel and useful transducer mounting device and method.

Another further object of the instant invention is to provide the transducer mounting device as characterized above which includes a composite of an encapsulation overlying and supporting a self-tapping stud at one end and a fabricated insert at an opposite end.

A further object of the instant invention is to provide the transducer mounting device as characterized above that is durable and inexpensive to manufacture.

Another further object of the instant invention is to provide the transducer mounting device as characterized above which includes a low torque self-tapping fastener that can be quickly inserted into an untapped hole disposed on a machine to be monitored.

Another further object of the instant invention is to provide the transducer mounting device as characterized above which is reliable in operation, easily removable and reusable.

Another further object of the instant invention is to provide a transducer mounting device and method as characterized above which eliminates the expensive installation cost particularly associated with the existing drill and tap devices and methods of mounting transducers to machines thereby providing a tremendous benefit when installing industrial plantwide networked asset systems which include mounting a multiplicity of seismic transducers to monitor general purpose machinery throughout the plant or facility.

Another further object of the instant invention is to provide a transducer mounting device and method as characterized above which solves the labor intensive and time consuming task inherent in the existing drill and tap devices and methods of mounting transducers to machines.

Another further object of the instant invention is to provide the transducer mounting device and method as characterized above which precludes the need for milling a spot face (a flat spot) onto a target and which precludes the need to use a drill motor which is typically required to be strapped to the machine.

A further primary object of the instant invention is to provide a further preferred form of a new, novel and useful transducer mounting device and method.

Another further object of the instant invention is to provide the further preferred form of the transducer mounting device and method as characterized above which provides a strong and durable magnetic/adhesive bond.

Another further object of the instant invention is to provide the further preferred form of the transducer mounting device and method as characterized above which provides a magnetic/adhesive bond which is much stronger than either bond alone.

Another further object of the instant invention is to provide the further preferred form of the transducer mounting device and method as characterized above which solves the short-term failure rates inherent in the existing adhesive attachment devices and methods of mounting transducers.

Another further object of the instant invention is to provide the further preferred form of the transducer mounting device and method as characterized above which eliminates the need for extensive documentation and machining time required for existing drill and tap devices and methods of mounting transducers to machines.

Viewed from a first vantage point, it is an object of the instant invention to provide a transducer mounting device, comprising in combination: a first elongated shaft having a first threaded portion disposed thereon; a second elongated shaft substantially axially aligned with the first elongated shaft and having a second threaded portion disposed thereon; a monolith of moldable material overlying and supporting the first and the second elongated shaft wherein the first elongated shaft extends away from a first end of the monolith of moldable material and the second elongated shaft extends away from a second end of the monolith of moldable material opposite the first end.

Viewed from a second vantage point, it is an object of the instant invention to provide a transducer mounting device, comprising in combination: a self-tapping screw; an insert having a threaded extremity, the insert substantially axially aligned with the self-tapping screw; a plastic body overlying and supporting the self-tapping screw and the insert along a central long axis of the device wherein the self-tapping screw extends away from a first end of the plastic body and the insert extends away from a second end of the plastic body opposite the first end.

Viewed from a third vantage point, it is an object of the instant invention to provide transducer mounting device, comprising in combination: a preform including an internal cavity an elongated member surmounting the preform for receiving a transducer; a magnetic component received within the internal cavity; an adhesive interposed between the magnetic component and a target for magnetically and adhesively bonding the preform to the target for monitoring the target with the transducer.

These and other objects and advantages will be made manifest when considering the following detailed specification when taken in conjunction with the appended drawing figures.

BRIEF DESCRIPTION OF THE DRAWINGS

FIG. 1 is a partial cutaway view of a transducer mounting device according to the instant invention and shown disposed on a machine to be monitored.

FIG. 2 is top plane view of the transducer mounting device shown in FIG. 1.

FIG. 3 is an exploded parts view of the transducer mounting device shown in FIG. 1.

FIG. 4 is an partial cross sectional view of the transducer mounting device shown in FIG. 1 and enlarged.

FIG. 5 is top plane view of a further preferred embodiment of a transducer mounting device according to the instant invention.

FIG. 6 is side plane view of the further preferred embodiment of the transducer mounting device according to the instant invention.

DESCRIPTION OF PREFERRED EMBODIMENTS

Figure 7:
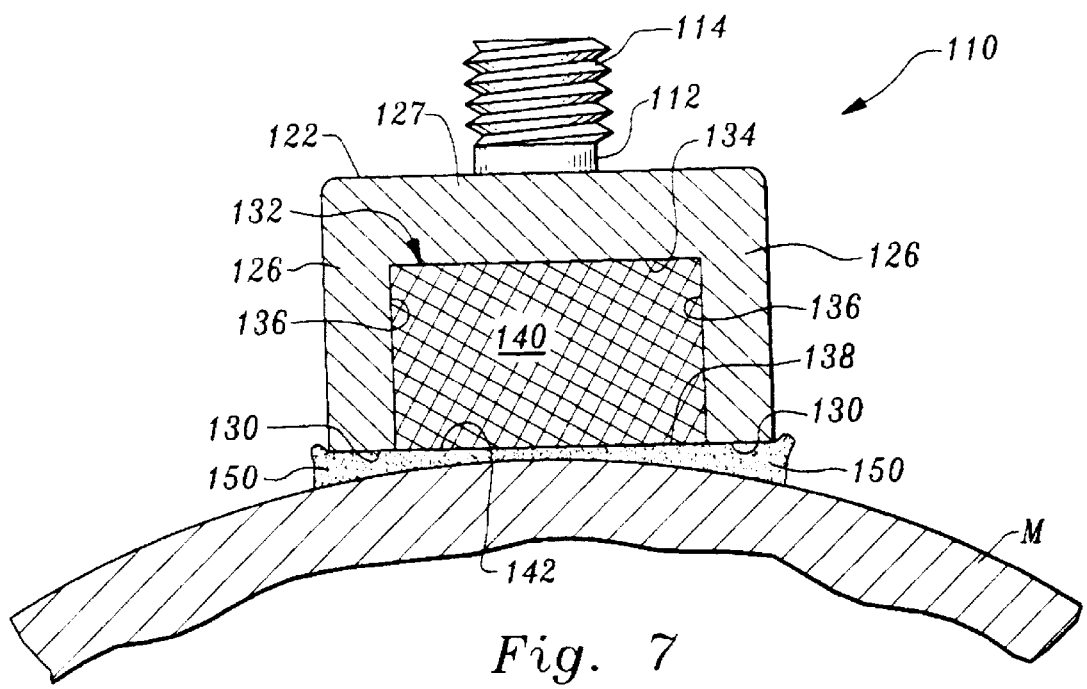
FIG. 7 is a partial cross sectional view of the further preferred embodiment of the transducer mounting device according to the instant invention and shown disposed on a machine to be monitored.

Considering the drawings, wherein like reference numerals denote like parts throughout the various drawing figures, reference numeral 10 is directed to one preferred transducer mounting device and reference numeral 110 is directed to a further preferred transducer mounting device.

In its essence, and referring to FIG. 1, the transducer mounting device 10 of the instant invention includes a faceted monolith of moldable material or plastic body 20 overlying and supporting two substantially axially aligned threaded metal components 40, 60.

Referring to FIGS. 3 and 4, the first metal component is comprised of a self-tapping screw 40 including a multi-faceted head 42, a shoulder 50 below the head 42 and a shaft 56 extending below the shoulder 50. The head 42 of the screw 40 includes a top surface 44 which can be indented and include a slot 46. The head 42 further includes six flat sides 48 disposed in a hexagonal pattern and which substantially perpendicularly transition from the top surface 44 to the shoulder 50. The shoulder 50 is preferably integrally formed with the head 42 in the form of a flat washer which radially projects beyond the sides 48 of the head 42 and includes a flat top bearing surface 52 and a flat bottom bearing surface 54. The shaft 56 is integrally formed with and extends below the shoulder 50. The shaft 56 includes exterior threads 57 that preferably extend from below the shoulder 50 to a distal tapered pilot point 58 that provides fast starts. The exterior threads 57 in combination with the distal tapered pilot point 58 precludes the necessity for tapping a hole disposed in a target, for example, the hole H in an area on a machine casing M (please see FIG. 1). This is accomplished by the fact that when the self-tapping screw 40 is torqued into the hole H disposed in the machine casing M the material around the screw 40 compresses during installation and forms a complemental thread pattern within the hole H for creating a zero-clearance fit without cutting chips of metal.

Preferably, the self-tapping screw 40 is a heat-treated thread forming or thread rolling screw which is sometimes referred to as a swageform screw and is formed from zinc-plated steel. In one form, the shaft 56 is 0.50 inches long having a 8–32 thread size, the shoulder is 0.02 inches thick and has a diameter of 0.34 inches and the head is a ¼ inch hex head which is 0.12 inches tall.

Still referring to FIGS. 3 and 4, the second metal component is comprised of a fabricated insert 60 that interfaces with a transducer 12. The fabricated insert 60 includes a faceted extremity 62 transitioning into an annular shaped neck 70. The neck 70 includes a plurality of collocated ribs 80 which transition into an elongated shank member 96 having exterior threads 98.

More specifically, the fabricated insert 60 is a one piece machined metal insert. The faceted extremity 62 of the insert includes a lower surface 64, a faceted side portion 66 and an upper surface 68. The lower surface 64 is substantially planar in shape and transitions into the faceted side portion 66 which in turn transitions into the upper surface 68 which is substantially planar in shape. The faceted side portion 66 can be comprised of various facet arrangements and in one preferred form the faceted side portion 66 includes facets which are arranged in a hexagonal pattern. The upper surface 68 transitions into the annular shaped extending neck 70 having a diameter that is preferably less than a diameter of the faceted extremity 62. The annular shaped neck 70 preferably includes one or more axially spaced orbicularly shaped collocated ribs 80 that radially protrude away from the neck 70. The ribs 80 transition into an elongated shank member 96 having a diameter which is preferably less than the diameter of the neck 70. The elongated shank member 96 includes exterior threads 98 circumscribing the shank 96 at an extremity distal from the collocated ribs 80. These threads mate with, for example, the seismic transducer 12 coupled to a processing means 16 via a transmission means 14 for monitoring the status of machine M (please see FIG. 1).

Preferably, the fabricated insert 60 is preferably formed from 303 stainless steel that is an austenitic material which is considered to have the best overall corrosion resistance of all stainless steels. Additionally, in one form, the faceted extremity has approximately a 9/16 inch diameter and is approximately 0.063 inches thick. The neck is approximately 0.127 inches tall and includes collocated ribs which radially extend approximately 0.031 inches away from the neck and are approximately 0.031 inches thick. Annular grove 88 is approximately 0.032 inches tall and annular grove 89 is approximately 0.033 inches tall. The shank 96 is approximately 0.25 inches tall and the threads (3/8-24 UNF) start approximately 0.29 inches distal from the lower surface 64 of the faceted extremity 62 and continue to an end 99 of the insert 60. Thus, the insert has an overall height of approximately 0.44 inches.

Referring to FIGS. 1 and 4, the self-tapping screw 40 and the fabricated insert 60 are disposed asunder along a central long axis 18 of the transducer mounting device 10 and are each partially encapsulated within the monolith of moldable material or plastic body 20. The plastic body 20 provides a low cost medium coupling between the self-tapping screw 40 and the fabricated insert 60 thereby eliminating the extensive and expensive tooling and time required to fabricate these out of a single piece of metal.

Referring to FIGS. 1 through 3, the monolith of moldable material or plastic body 20 includes an uppermost surface 22, a side portion 24 and a lowermost surface 26. The uppermost surface 22 is substantially planar in shape and transitions substantially perpendicularly into the side portion 24. The side portion 24 in turn transitions into the lowermost surface 26 which is preferably substantially planar in shape. The side portion 24 preferably includes multiple facets 28 arranged to allow a torque applying device to effectively engage the body 20. Preferably, the facets are arranged in a hexagonal pattern to be engaged by a variety of commonly available tools for inserting the device 10 into a hole. Both the uppermost surface 22 and the lowermost surface 26 includes a plurality of chamfers 30 which are disposed at transition areas between the boundaries of the facets 28 and both the uppermost and lowermost surfaces 22, 24.

Preferably, the plastic used for the monolith of moldable material, plastic body or encapsulation 20 is a thermosetting vinyl ester. This material exhibits good resistance to water, humidity, acids, alkalis and oils. Additionally, in one form, the faceted monolith of moldable material 20 has a one inch diameter and is approximately 0.63 inches tall.

The body 20 may be formed by transfer molding wherein a mold having an interior which is the negative or reverse of the plastic body 20 shown in FIGS. 1 through 3 is used to form body 20. The self-tapping screw 40 and the fabricated insert 60 are disposed within the mold along a central long axis 18 such that the substantially planar lower surface 64 of the insert 60 is spaced from and faces the top surface 44 of the multi-faceted head 42 of the self-tapping screw 40. A portion of the threaded shaft 56 of the screw 40 and a portion of the shank 96 of the fabricated insert 60 extend through the mold such that they lie on the outside of the mold. Thus, the self-tapping screw 40 and the fabricated insert 60 are each partially encapsulated within the monolith of moldable material or plastic body 20 as shown in FIGS. 1 and 4. In one form, the spacing between the screw 40 and the insert 60 is approximately 0.19 inches apart. Thus, the body 20 may be formed by transfer molding as is now evident to those having ordinary skill in the art, informed by the present disclosure.

Referring to FIG. 4, the monolith of moldable material or plastic body 20 envelopes the multi-faceted head 42 which includes the slotted indented top surface 44 and the six flat sides 48 formed with the shoulder 50 which radially projects beyond the sides 48 and provides the flat bearing surfaces 52, 54. Additionally, the monolith of moldable material or plastic body 20 envelopes a portion of the shaft 56 including a portion of the exterior threads 57 disposed thereon.

The multi-faceted head 42 of the self-tapping screw 40 precludes torsional shear within the monolith of moldable material 20 along the double ended arrow $F_{T1}$. As a result the self-tapping screw is locked into the monolith of moldable such that rotational torque does not cause the self-tapping screw to rotate separate from the device 10. Furthermore, the top surface 44 of the head 42 precludes axial shear in a direction towards the insert 60 by abutting the moldable material which separates the screw 40 from the insert 60. Additionally, the annular shoulder 50 provides the flat bearing surfaces 52, 54 which preclude axial shear within the monolith of moldable material along the double ended arrow $F_{S1}$. In other words, the top surface 44 and the annular shoulder 50 axially lock the self-tapping screw 40 into the monolith of moldable material or plastic body 20 to preclude axial forces from dislodging the self-tapping screw 40 within or from the monolith of moldable material or plastic body 20. The portion of the threads 57 of the screw 40 which are encapsulated in the monolith of moldable material providing a gripping action which also precludes axial and torsional shear from dislodging the screw 40 within or form the monolith of moldable material 20.

The monolith of moldable material or plastic body 20 preferably also envelopes the faceted extremity 62, the annular shaped neck 70, the collocated ribs 80 and a portion of the elongated shank 96 proximate the collocated ribs 80. The faceted extremity 62 of the fabricated insert 60 precludes torsional shear within the monolith of moldable material 20 along the double ended arrow $F_{T2}$ while the lower and upper surfaces 64, 68 of the faceted extremity 62 preclude axial shear within the monolith of moldable material 20 along the double ended arrow $F_{S2}$. Additionally, the collocated ribs 80 provide flat bearing surfaces (lower surfaces 84, 92 and upper surfaces 86,94) which preclude axial shear within the monolith of moldable material 20 along the double ended arrow $F_{S2}$.

The monolith of moldable material further includes a first interlocking means for interlocking the monolith of moldable material into the fabricated insert is integrally formed with the monolith of moldable material 20 and includes an extension circumferentially extending into an annular recess 88 disposed between the collocated ribs 80 for mechanically interlocking the monolith of moldable material 20 into the fabricated insert 60 and for precluding axial shear along the double ended arrow $F_{S2}$. Additionally, a second interlocking means for interlocking the monolith of moldable material 20 into the fabricated insert is integrally formed with the monolith of moldable material 20 and includes a second extension circumferentially extending into an annular recess 89 disposed between the upper surface 68 of the faceted extremity 62 and a lower surface 84 of rib 82 for mechanically interlocking the monolith of moldable material 20 into the fabricated insert 60 and for precluding axial shear along the double ended arrow $F_{S2}$. Moreover, an upper surface 94 of rib 90 abuts against a wall 32 integral with the monolith of moldable material 20 at an area proximate to the portion of the monolith 20 that circumferentially surrounds the elongated shank 96 for precluding axial shear from pulling the insert 60 from the monolith of moldable material 20.

In a further preferred form, and referring to FIG. 7, the transducer mounting device 110 of the instant invention includes an elongated member 112 surmounting a preform 120 overlying a magnetic component 140 adhesively coupled with adhesive 150 at one end to a target, for example, a machine casing M or bearing housing being monitored. The elongated member 112 interfaces with, for example, the seismic transducer 12 coupled to the processing means 16 via the transmission means 14 for monitoring the status of machine M.

The device 110 addresses the inherent weaknesses of a transducer mounting stud being adhesively bonded to machine casings or bearing housings, namely the lack of adherence to casted metals and time degradation of the adhesive strength when subjected to long term loading (transducer plus associated wiring and conduit). The magnet may be able to support the transducer itself however, the magnet has a tendency to "walk around" and generally lacks shear strength. Thus, the adhesive is used to provide, inter alia, stability.

Moreover, an adhesive bond is most successful when the adhesive thickness itself is at a minimum. Heretofore, a mounting stud was glued to the target and clamped down with a clamping mechanism until the adhesive was cured. However, this method provided a bond thickness of about 20 to 30 mils which have a known proclivity towards failure. Thus, the instant invention solves this problem by providing means for sustaining a continuous large amount of bonding pressure for a long duration for forming a thin adhesive bond (as thin as 5 mils) or in other words, the adhesive thickness itself is at a minimum. The sustaining means includes employing a magnetic component adhesively coupled at one end to the target. This type of coupling provides a greater amount of bonding pressure for a longer time period. During testing this type of bond required several hammer blows to be removed and when removed it was found that the adhesive residue was distributed equally on both the stud and casted surface, indicating a superior bond to both surfaces (as mentioned in the background of the invention, the prior art adhesive bond failures left almost all the adhesive residue on the stud itself, indicating not a mechanical adhesive failure, but a failure of the original bond). In comparison, the individual separate use of the magnet or the adhesive exhibited shear strengths of 84 and 160 in-lbs respectively. However, it was discovered that the magnetic adhesive bond according to the instant invention could obtain a shear strength of approximately at least 300 in-lbs and up over approximately 800 in-lbs. Thus, the magnetic adhesive bond according to the instant invention provides a bonding strength which is multiple times as strong as the bonding strength of the magnet or adhesive only bond using the same magnet or adhesive respectively.

More specifically, and referring to FIGS. 5 through 7, the transducer mounting device 110 preferably includes the elongated member 112 in the form of a cylindrical member 112 incised with one or more helical or advancing spiral threads 114. The elongated member 112 preferably centrally surmounts and is integrally formed with the preform 120 at a radiused transition area. Preferably, the preform 120 is a cylindrical shell 120 including a top wall 127, sidewalls 126 and an opened bottom end 138. The top wall 127 includes a substantially planar top surface 122 having an outer radiused periphery 124 transitioning into sidewall 126 having a cylindrical exterior surface 128. The exterior surface 128 substantially perpendicularly extends between the top surface 122 and a bottom peripheral lip 130. The shell 120 further includes an internal cavity 132 having a top closed wall 134, sidewall 136 integrally formed with the top closed wall 134 and extending between the top closed wall 134 and the bottom peripheral lip 130 wherein the opened bottom end 138 of the cavity 132 is defined. The internal cavity 132 may be cylindrically shaped and include a circular top wall 134 transitioning into a cylindrical sidewall 136. The cavity 132 of the shell 120 receives a magnet that may be complemental in shape to the interior of the cavity 132 or which may be of an arbitrary shape which is smaller than the interior of the cavity 132. Any space between the magnet 140 and the interior of the cavity 132 may be filled with a separate material such that the magnet fits snuggly within the cavity 132 of the shell 120.

In one form, the shell has a diameter of 1.25 inches and a height of 0.75 inches. The cavity extends 0.50 inches into the shell and has a 0.88 inches diameter which is concentric with the shell diameter. The elongated member 112 extends approximately 0.25 inches from the top surface of the shell and includes threads 114 which are start approximately 0.07 inches away from the top of the shell.

Preferably, the shell is fabricated using 17-4 stainless steel which has excellent corrosion resistance to water, light acids and bases. Additionally, the magnet is preferably a high power Neodymium rare earth magnet and the elongated member is a ⅜-24 thread size. Furthermore, the adhesive is preferably a modified acrylic adhesive such as that manufactured under part number CB200 by Click Bond, a Carson City, Nev. Company.

In use and operation, and referring to FIG. 1, the device 10 employs the self-tapping screw 40 in the form of, for example, low torque self-tapping screw having an 8-32 UNC thread size which is coupled by the faceted monolith of moldable material or plastic body 20 to the stainless steel insert 60 having a ⅜-24 UNF thread size disposed on the shank 96 for providing a fast and reliable method of attaching, for example, a low frequency (less than 2 khz) seismic transducer to a general purpose rotating machine.

The first step in attaching the transducer mounting device 10 to a target, for example, a machine casing M or a bearing housing in which a transducer is to be received requires selecting an appropriate mounting location for the device 10. Next, thoroughly clean the selected location, removing all oils and dirt. Then, using a drill with, for example, a #26 drill bit (0.147 inches) drill a 8 mm (5/16 inch) deep hole H perpendicular to the surface of the target. This is most easily accomplished with a drill motor having a built in level or with a fixture to ensure perpendicularity.

Next, the tip 58 of the self-tapping screw 40 is placed into the hole H and threads are created therein by rotating the device 10 by hand at first, and then finishing with a torque applying instrument such as a wrench or socket. The torque applying instrument is coupled to the faceted body 20 and rotated until a point of contact is reached between the target material and the base 26 of the faceted body 20. This abutment, inter alia, prevents the device 10 from translating along the central long axis 18 any deeper into the hole H. Note that when the torque applying instrument is rotated the exterior threads 57 of the self-tapping screw 40 depress material around the exterior threads 57 thereby forming threads in the hole H which are substantially complemental in form to the exterior threads 57 of the self-tapping screw 40.

Once the transducer mounting device is installed a seismic transducer 12 can be threadedly coupled to the threaded extremity in the form of, for example, a ⅜-24 thread size 98 of the elongated shank 96 and connected to a signal processor 16 via signal transmission medium 14 for transmitting signals engendered from the seismic transducer 12 correlative to the status of the machinery being monitored.

If desired, the device 10 can be removed and a liquid thread locking material can be applied to the threads of the self-tapping screw and then the screw can be reinserted into the hole being careful not to cross thread the hole.

The device 110 employs a strong magnet coupled with a powerful adhesive to provide a fast and reliable method of attaching, for example, a low frequency (less than 2 khz) transducer 12 to a variety of general purpose rotating machinery.

Figure 8:
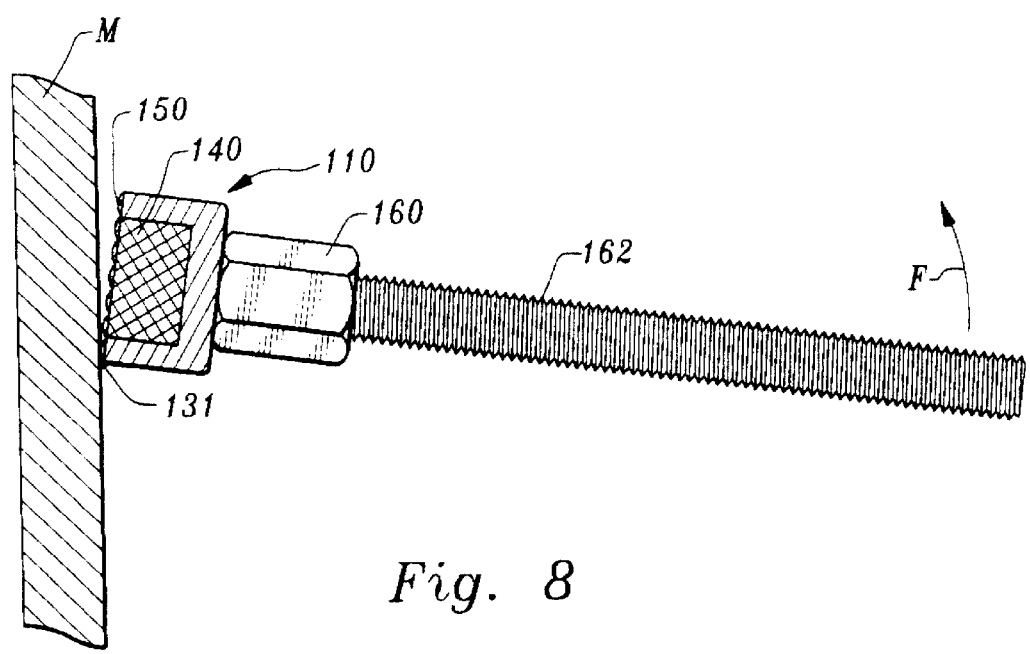
FIG. 8 is a partial cross sectional view of the further preferred embodiment of the transducer mounting device according to the instant invention and shown being placed at one corner wherein a levering action will put the device onto a machine to be monitored.

Since the device 110 includes a strong magnet, a method is needed to prevent the device from snapping against the machine case during installation and splattering the adhesive. Referring to FIG. 8, one method according to the instant invention includes the step of coupling a long threaded rod 162 to the threads 114 of the device 110 via an internally threaded sleeve 160 that threadedly engages both the threads 114 on the device 110 and the threaded rod 162. Then, selecting an appropriate mounting location for the device 110. Next, thoroughly cleaning and grinding the selected location, removing all paint, oil and dirt, preferably leaving only shiny (bare) metal. Then, applying the adhesive 150 to the bottom side of the magnet 140 and then placing a lower corner 131 of the device 110 to the bottom of the target area. Next, slowly levering the magnet up and into place along the arrow F, being careful not to splatter the adhesive. Thus, the method according to the instant invention allows the device 110 to be placed slowly and smoothly into place, minimizing adhesive loss. When complete, there should only be a small ring of adhesive squeezed out from under the mount. Finally, remove the threaded rod careful, and move on to the next target. Allow the adhesive to cure (preferably 24 hours) prior to coupling the transducer to the device 110. For best results, the surface temperature of the target area should be less than eighty degrees Celsius during application and curing of the adhesive.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A transducer mounting device, comprising in combination:

a first elongated shaft having a first threaded portion disposed thereon;

a second elongated shaft substantially axially aligned with said first elongated shaft and having a second threaded portion disposed thereon;

a monolith of moldable material overlying and supporting said first and said second elongated shaft wherein said first elongated shaft extends away from a first end of said monolith of moldable material and said second elongated shaft extends away from a second end of said monolith of moldable material opposite said first end;

further including a multi-faceted head surmounting said first elongated shaft and encapsulated within said monolith of moldable material wherein said multi-faceted head precludes torsional shear from rotating said first elongated shaft substantially along a central long axis of said device.

2. The device of claim 1 further including a shoulder interposed between said head and said first elongated shaft and encapsulated within said monolith of moldable wherein said shoulder precludes axial shear from moving said first elongated shaft within and from said monolith of moldable material substantially along said central long axis of said device.

3. The device of claim 2 wherein said first threaded portion of said first elongated shaft extends from below said shoulder to a distal end for promoting fast starts when inserting said first elongated shaft into a hole disposed on a target to be monitored.

4. The device of claim 3 further including a multi-faceted extremity surmounting said second elongated shaft and encapsulated within said monolith of moldable material wherein said multi-faceted extremity precludes torsional shear from rotating said second elongated shaft substantially along said central long axis of said device.

5. The device of claim 4 further including a neck interposed between said multi-faceted extremity and said second elongated shaft and encapsulated within said monolith of moldable material wherein said neck further includes at least one rib radially protruding from said neck and spaced from said faceted extremity and defining an annular groove between a lower surface of the said rib and an upper surface of said faceted extremity.

6. The device of claim 5 wherein said monolith of moldable material includes an integrally formed interlocking means in the form of an extension of moldable material circumferentially extending into said annular groove for mechanically interlocking said monolith of moldable material between said faceted extremity and said rib.

7. A transducer mounting device, comprising in combination:

a first elongated shaft having a first threaded portion disposed thereon;

a second elongated shaft substantially axially aligned with said first elongated shaft and having a second threaded portion disposed thereon;

a monolith of moldable material overlying and supporting said first and said second elongated shaft wherein said first elongated shaft extends away from a first end of said monolith of moldable material and said second elongated shaft extends away from a second end of said monolith of moldable material opposite said first end;

further including a multi-faceted head surmounting said first elongated shaft and encapsulated by said monolith of moldable material wherein said multi-faceted head precludes torsional shear from rotating said first elongated shaft within said monolith of moldable material and precludes axial shear from moving said first elongated shaft substantially along a central long axis of said device.

8. A transducer mounting device, comprising in combination:

a first elongated shaft having a first threaded portion disposed thereon;

a second elongated shaft substantially axially aligned with said first elongated shaft and having a second threaded portion disposed thereon;

a monolith of moldable material overlying and supporting said first and said second elongated shaft wherein said first elongated shaft extends away from a first end of said monolith of moldable material and said second elongated shaft extends away from a second end of said monolith of moldable material opposite said first end;

further including a multi-faceted extremity surmounting said second elongated shaft and encapsulated within said monolith of moldable material wherein said multi-faceted extremity precludes torsional shear from rotating said second elongated shaft within said monolith of moldable material and precludes axial shear from moving said second elongated shaft substantially along a central long axis of said device.

9. The device of claim 8 further including a neck interposed between said multi-faceted extremity and said second elongated shaft and encapsulated within said monolith of moldable material wherein said neck further includes a plurality of axially collocated ribs radially protruding from said neck and defining an annular groove between any two collocated ribs.

10. The device of claim 9 wherein said monolith of moldable material includes an integrally formed interlocking means in the form of an extension of moldable material circumferentially extending into said annular groove between any two collocated ribs for mechanically interlocking said monolith of moldable material between said any two collocated ribs.

11. A transducer mounting device, comprising in combination:

a self-tapping screw;

an insert having a threaded extremity, said insert substantially axially aligned with said self-tapping screw;

a plastic body overlying and supporting said self-tapping screw and said insert along a central long axis of said device wherein said self-tapping screw extends away from a first end of said plastic body and said insert extends away from a second end of said plastic body opposite said first end.

12. A device of claim 11 wherein said self-tapping screw is a thread rolling screw including a multi-faceted head surmounting a threaded shaft which extends below said head to a tapered pilot point wherein the tapered pilot point promotes the alignment of said screw within a hole disposed in a target to monitored and the threaded shaft provides means for forming a complemental thread pattern within the hole by compressing material around the threaded shaft during installation.

13. A device of claim 12 wherein said insert includes a multi-faceted extremity transitioning into an annular shaped neck, said neck including a plurality of radially extending collocated ribs which transition into an elongated shank supporting said threaded extremity, said threaded extremity capable of mating with a transducer monitoring status of the target.

* * * * *